UNITED STATES PATENT OFFICE.

JOSEPH HAY AMIES, OF PHILADELPHIA, PENNSYLVANIA, ASSIGNOR TO THE AMIES ASPHALT COMPANY, OF PHILADELPHIA, PENNSYLVANIA, A CORPORATION OF SOUTH DAKOTA.

BITUMINOUS CEMENT.

935,573.  Specification of Letters Patent.  Patented Sept. 28, 1909.

No Drawing.  Application filed February 20, 1909.  Serial No. 479,257.

*To all whom it may concern:*

Be it known that I, JOSEPH HAY AMIES, a citizen of the United States, residing at Philadelphia, in the county of Philadelphia and State of Pennsylvania, have invented a certain new and useful Improved Bituminous Cement, of which the following is a specification.

My present invention has reference to the formation of a bituminous or resinous cement to be used as a binder in making compositions for paving or like purposes.

My process is as follows:—I take a quantity of calcium oxid and crush it. I also take a quantity of bituminous or resinous elements and heat them. It is preferable not to add water to the pulverized calcium oxid but unite it to the hot bituminous or resinous elements in a dry condition. As soon as it can be well stirred in, a batch quantity of heated mineral matters or the like is mixed therewith. It would defeat my purpose to start the calcium oxid to slake before the mineral matters are added and mixed therewith. The bituminous elements may preferably be mixed with the mineral materials before the dry calcium oxid is mixed in, because the hot bituminous or resinous elements would then thicken and stiffen to such an extent, that a due amount of mineral matters could not be mixed with the said elements. I use preferably heated mineral elements because the mixing is much more effective and a due quantity thereof may be used, but I can use the mineral matters in a cold state; and I may dampen the calcium oxid with water, provided I add the mineral matter and the calcium oxid to the bituminous or resinous elements at the same time. I do this in order to secure the mixing before the calcium oxid can act upon the bituminous or resinous elements. I may use the said bituminous or resinous elements in a cold state provided they are thin enough, and a sufficient amount of calcium oxid is used to take up and convert the water and the volatile oil of the said bituminous or resinous elements. I may mix the bituminous or resinous elements together in the said employment. I have found that the best results may be obtained by adding the calcium oxid in a dry state to the hot bituminous or resinous elements and at once adding the heated mineral or like elements and quickly stirring them together. In this way I have been enabled to use a due quantity of mineral elements.

Carbonate of lime is used in bituminous cements; but the action of carbonate of lime and calcium oxid upon bituminous or resinous cements is different and different effects result. For my purpose calcium oxid is essential.

What I claim is:—

1. The herein described process of making a composition for paving and like purposes which consists in mixing together crushed calcium oxid, mineral elements, heated bituminous and resinous materials the said crushed calcium oxid being mixed with the mass while in a dry state and before the calcium oxid begins to slake, substantially as described.

2. The herein described method of making a composition for paving and like purposes which consists in mixing together mineral matters and the like, bituminous and resinous materials, crushed calcium oxid and water the said crushed calcium oxid and water being mixed with the mass before slaking takes place, substantially as described.

In testimony whereof I hereunto sign my name in the presence of two witnesses.

JOSEPH HAY AMIES.

Witnesses:
WILLIAM J. JACKSON,
S. F. KOCH.